(12) United States Patent
Vechev et al.

(10) Patent No.: US 9,069,893 B2
(45) Date of Patent: Jun. 30, 2015

(54) AUTOMATIC VERIFICATION OF DETERMINISM FOR PARALLEL PROGRAMS

(75) Inventors: Martin Vechev, Yorktown Heights, NY (US); Eran Yahav, Haifa (IL); Raghavan Raman, Houston, TX (US); Vivek Sarkar, Houston, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 432 days.

(21) Appl. No.: 13/070,232

(22) Filed: Mar. 23, 2011

(65) Prior Publication Data

US 2012/0246662 A1    Sep. 27, 2012

(51) Int. Cl.
| | |
|---|---|
| G06F 9/46 | (2006.01) |
| G06F 12/00 | (2006.01) |
| G06F 9/45 | (2006.01) |
| G06F 11/36 | (2006.01) |
| G06F 9/445 | (2006.01) |

(52) U.S. Cl.
CPC .... G06F 11/3608 (2013.01); *G06F 2209/5017* (2013.01); G06F 9/44589 (2013.01)

(58) Field of Classification Search
None
See application file for complete search history.

(56) References Cited

U.S. PATENT DOCUMENTS

| | | | | |
|---|---|---|---|---|
| 6,078,745 | A * | 6/2000 | De Greef et al. | 717/151 |
| 6,263,406 | B1 * | 7/2001 | Uwano et al. | 711/141 |
| 7,577,536 | B1 * | 8/2009 | Chisholm et al. | 702/65 |
| 7,840,839 | B2 * | 11/2010 | Scales et al. | 714/13 |
| 7,844,781 | B2 * | 11/2010 | Corrigan et al. | 711/147 |
| 7,950,005 | B2 * | 5/2011 | Kawahito et al. | 717/126 |
| 8,117,403 | B2 * | 2/2012 | Heller et al. | 711/150 |
| 8,245,239 | B2 * | 8/2012 | Garyali et al. | 718/107 |
| 2002/0040470 | A1 * | 4/2002 | Guthrie et al. | 717/126 |
| 2007/0198979 | A1 * | 8/2007 | Dice et al. | 718/100 |
| 2007/0277166 | A1 * | 11/2007 | Kawahito et al. | 717/155 |
| 2008/0005737 | A1 * | 1/2008 | Saha et al. | 718/100 |
| 2008/0109812 | A1 * | 5/2008 | Vertes et al. | 718/104 |
| 2009/0031290 | A1 * | 1/2009 | Feng et al. | 717/126 |
| 2009/0138862 | A1 * | 5/2009 | Tanabe et al. | 717/149 |
| 2009/0222825 | A1 * | 9/2009 | Upadhyaya et al. | 718/102 |
| 2010/0070979 | A1 * | 3/2010 | Ludwin et al. | 718/106 |
| 2010/0083257 | A1 * | 4/2010 | Zhu et al. | 718/101 |
| 2010/0153937 | A1 * | 6/2010 | Richards et al. | 717/149 |
| 2010/0306733 | A1 * | 12/2010 | Bordelon et al. | 717/106 |

(Continued)

OTHER PUBLICATIONS

Burnim, J., and Sen, K. Asserting and checking determinism for multithreaded pro-grams. In ESEC/FSE '09: Proceedings of the 7th joint meeting of the European software engineering conference and the ACM SIGSOFT symposium on The foundations of software engineering on European software engineering conference and foundations of software en-gineering symposium (New York, NY, USA, Aug. 23-28, 2009), ACM, pp. 3-12.

(Continued)

*Primary Examiner* — Tammy Lee
(74) *Attorney, Agent, or Firm* — F. Chau & Associates, LLC; Louis J. Percello (57) ABSTRACT

Automatic verification of determinism in structured parallel programs includes sequentially establishing whether code for each of a plurality of tasks of the structured parallel program is independent, outputting sequential proofs corresponding to the independence of the code for each of the plurality of tasks and determining whether all memory locations accessed by parallel tasks of the plurality of tasks are independent based on the sequential proofs.

12 Claims, 3 Drawing Sheets

(56) References Cited

U.S. PATENT DOCUMENTS

| | | | |
|---|---|---|---|
| 2011/0087866 A1* | 4/2011 | Shah et al. | 712/239 |
| 2011/0093854 A1* | 4/2011 | Blanc et al. | 718/101 |
| 2012/0166742 A1* | 6/2012 | Wang et al. | 711/154 |

OTHER PUBLICATIONS

Sadowski, C., Freund, S. N., and Flanagan, C. SingleTrack: A dynamic determinism checker for multithreaded programs. In Programming Languages and Systems (Mar. 2009), vol. 5502 of Lecture Notes in Computer Science, Springer Berlin / Heidelberg, pp. 394-409.

Raza, M., Calcagno, C., and Gardner, P. Automatic parallelization with separation logic. In ESOP Mar. 2009: Proceedings of the 18th European Symposium on Programming Languages and Systems (Berlin, Heidelberg, 2009), Springer-Verlag, pp. 348-362.

Rugina,R.,Andrinard,M.Automatic parallelization of divide and conquer algorithms. In PPoPP '99: Proceedings of the seventh ACM SIGPLAN symposium on Principles and practice of parallel programming (New York, NY, USA, May 1999), ACM, pp. 72-83.

Rugina, R., and Rinard, M. Symbolic bounds analysis of pointers, array indices, and accessed memory regions. In PLDI '00: Proceedings of the ACM SIGPLAN 2000 conference on Programming language design and implementation (New York, NY, USA, Jun. 2000), ACM, pp. 182-195.

Rugina,R.,Andrinard,M.C. Symbolicboundsanalysisofpointers,arrayindices,and accessed memory regions. ACM Trans. Program. Lang. Syst. 27, 2 (Mar. 2005), 185-235.

Ferrara,P.Static analysis of the determinism of multithreaded programs.InProceedings of the Sixth IEEE International Conference on Software Engineering and Formal Methods (SEFM 2008) (Nov. 2008), I. C. Society, Ed.

\* cited by examiner

```
1  void update(final double[][] B, final double[][] C) {
2    finish {
3      asynch {
4        for (int i=1; i <=n; i++) {
5          double tmp1 = C[2*i];      {R:({A_C}, (2 ≤ idx ≤ 2*n))}
6          B[i] = tmp1;               {W:({A_B}, (1 ≤ idx ≤ n))}
7        }
8      }
9      asynch {
10       for (int j=n; j <=2*n; j++) {
11         double tmp2 = C[2*j+1];    {R:({A_C}, (2*n+1 ≤ idx ≤ 4*n+1))}
12         B[j] = tmp2;               {W:({A_B}, (n ≤ idx ≤ 2*n))}
13       }
14     }
15   }
16 }
```

FIG. 5

AUTOMATIC VERIFICATION OF DETERMINISM FOR PARALLEL PROGRAMS

BACKGROUND OF THE INVENTION

1. Technical Field

The present disclosure relates to a system and method for automatically verifying determinism of structured parallel programs.

2. Discussion of Related Art

One difficulty in parallel programming is the need to reason about possible interleavings of concurrent operations. Typically, the number of interleavings, even for small programs, makes this task difficult. To simplify reasoning about parallel programs, it is desirable to reduce the number of interleavings that need to be consider. One way to achieve that is to require parallel programs to be deterministic. Informally, determinism means that for a given input state, the parallel program will always produce the same output state. Determinism is an attractive correctness property as it abstracts away the interleavings underlying a computation.

BRIEF SUMMARY

According to an embodiment of the present disclosure, a system and method for automatic verification of determinism in structured parallel programs sequentially establish whether code for each of a plurality of tasks of the structured parallel program is independent, output sequential proofs corresponding to the independence of the code for each of the plurality of tasks and determine whether all memory locations accessed by parallel tasks of the plurality of tasks are independent based on the sequential proofs.

According to an embodiment of the present disclosure, a method for automatically verifying determinism of a structured parallel program includes determining reachable abstract states of a plurality of tasks of the structured parallel program having a reference array of objects, sequentially determining whether memory accesses of each of the plurality of tasks are independent of tasks that execute in parallel, and establishing the determinism of the structured parallel program based on the sequential determination of task independence.

BRIEF DESCRIPTION OF THE SEVERAL VIEWS OF THE DRAWINGS

Preferred embodiments of the present disclosure will be described below in more detail, with reference to the accompanying drawings.

DETAILED DESCRIPTION

According to an embodiment of the present disclosure, a static analysis may be performed for automatically verifying determinism of structured parallel programs. According to an embodiment of the present disclosure, the structure of the program may be leveraged to reduce determinism verification to an independence property that can be proved using a sequential analysis. Given a task-parallel program, program fragments that may execute in parallel are identified. It is checked that the program fragments perform independent memory accesses using a sequential analysis. Since the program fragments that can execute in parallel are typically only a small fraction of a given program, numerical abstractions may be performed to establish that tasks executing in parallel only perform independent memory accesses. Herein, methods are described in the context of an analysis tool.

Figure 1:
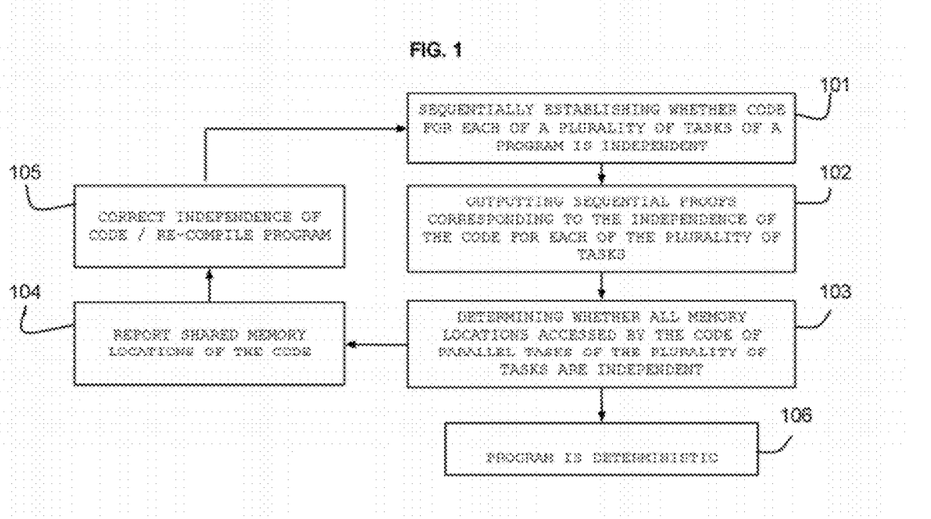
FIG. 1 is a flow chart of a memory for automatic verification of determinism in structured parallel programs according to an embodiment of the present disclosure.

Referring to FIG. 1, an automatic verification of determinism includes a sequential analysis to establish independence of statements in the parallel program 101. The analysis applies an assume-guarantee reasoning, wherein the code of each task is analyzed sequentially. Based on sequential proofs 102, whether each statement is independent, produced by the sequential analysis, it is checked whether an independence assumption is true 103. The independence assumption is that all memory locations that the tasks accesses are independent from locations accessed by tasks that may execute in parallel.

For each pair of statements that may execute in parallel, the analysis tool checks that the statements' memory accesses are independent. The analysis tool does not assume any a priori bounds on the number of heap allocated objects, the number of tasks, or sizes of arrays. The restricted structure of parallelism limits the code for which interference checks are needed and enables the use of numerical domains.

In a cases where the program is not deterministic, conflicting instructions or code are identified 104. The code may be modified to correct the conflicts 105, and the analysis tool may be re-applied until the program is determined to be deterministic 106.

Because arrays are heap allocated objects, information about the heap may be combined with information about array indices. Numerical domains such as Octagon and Polyhedra may be used to establish the independence of array accesses. Domains may be used to track relationships between index variables in realistic parallel programs.

Embodiments of the present disclosure are discussed in terms of an analysis tool. The analysis tool uses numerical domains (e.g., the octagon and polyhedra domains), which may be found in the Apron numerical library. The analysis tool may take as input a Java program annotated with structured parallel constructs and automatically checks whether the program is deterministic. In the case where the analysis fails to prove that the program is deterministic, the analysis tool provides a description of abstract shared locations that potentially lead to non-determinism.

Figure 2:
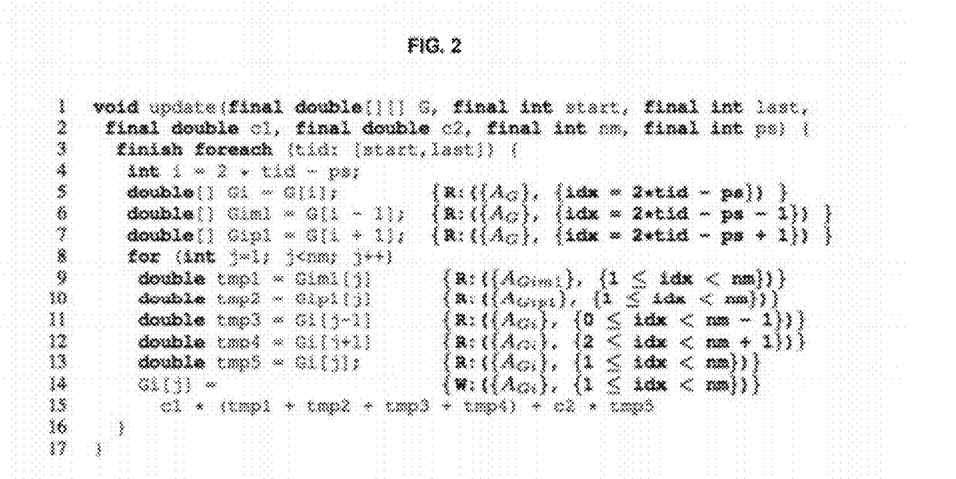
FIG. 2 is exemplary code extracted from a SOR benchmark.

FIG. 2 shows exemplary code for an update method extracted from a SOR (Successive Over-Relaxation) benchmark program. The SOR program uses parallel computation to apply the method of successive over-relaxation for solving a system of linear equations. The following description assumes that one would like to establish whether the exemplary code is deterministic.

The SOR program may be written in Java with structured parallel constructs. The foreach (var: [l,h]) statement spawns child tasks in a loop, iterating on the value range between l and h. Each loop iteration spawns a separate task and passes a unique value in the range [l, h] to that task via the task local variable var.

In addition to foreach, the exemplary language also supports constructs such as fork, join, async and finish. Other contemplated languages include, for example, X10, Cilk and the Java Fork-Join framework. The semantics of the finish {s} statement is that the task executing the finish blocks and waits at the end of the statement until all descendant tasks created by the task in s (including their recursively created children tasks), have terminated.

According to the exemplary code of FIG. 2, tasks are created by foreach in the range of [start,last]. Each task spawned by the foreach loop is given a unique value for tid. This value is used to determine an index for accessing a two-dimensional array G[ ][ ]. Because foreach is preceded by the finish construct, the main task that invoked the foreach statement cannot proceed until all concurrently executing tasks created by foreach have terminated.

Establishing Determinism by Independence

The exemplary analysis tool automatically verifies determinism (e.g., for the example given in FIG. 2) by showing that statements that may execute in parallel either access disjoint locations or read from the same location. The analysis tool analyzes each task sequentially and determines an over-approximation of the tasks' memory accesses and checks independence of memory accesses that may execute in parallel.

Determining an Over-Approximation of Memory Accesses

The over-approximation of the memory locations read/written by every task at a given program point is described herein as an exemplary method (treatment of array accesses). The treatment of object fields is substantially the same, such that a description thereof is omitted.

In the programming language, arrays are heap-allocated objects: to capture information about what array locations are accessed, an abstract representation combines information about the heap with information about array indices.

Figure 3:
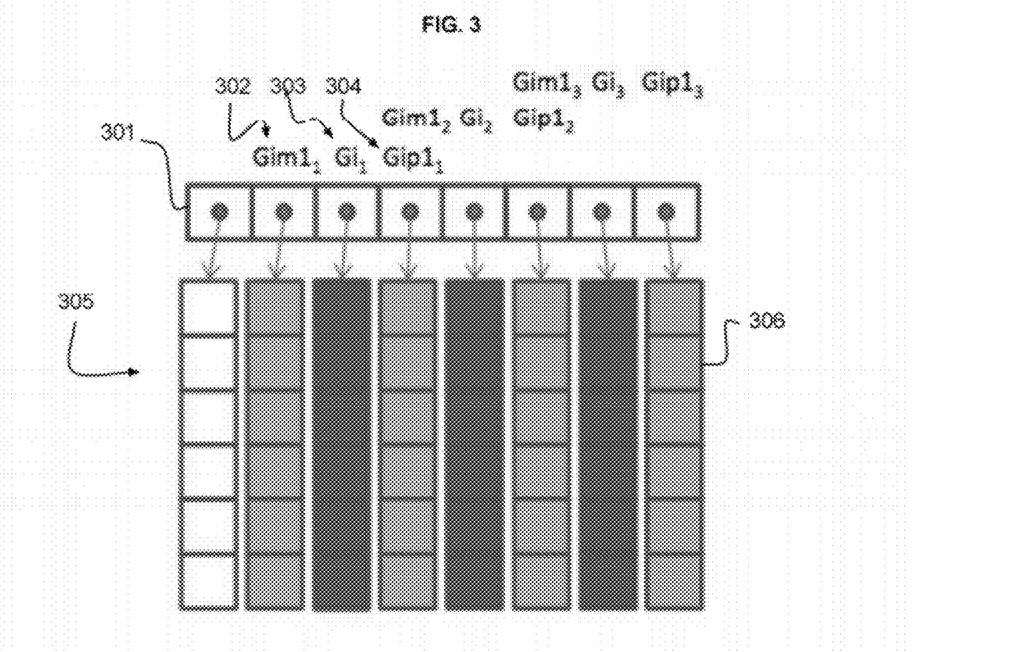
FIG. 3 is an exemplary array G[ ] [ ] in SOR with three tasks with tids 1,2,3 accessing the array.

FIG. 3 shows the array G[ ][ ] 301 of a running example where three tasks with task identifiers (tid) 1, 2, and 3 302-304 access the array.

In FIG. 3, local variables are subscript with the task identifier of the task to which they belong. Note that the only columns being written to are $Gi_1$, $Gi_2$, $Gi_3$. Columns that are accessed by two tasks are always only read, not written. The 2D array 301 is represented using one-dimensional arrays 305. Memory locations of the 2D array 301 point to ones of the one-dimensional arrays 305. Individual cells, e.g., 306, of the one-dimensional arrays 305 point to memory locations of, for example, objects. Assume/guarantee reasoning is used to analyze each task separately, via sequential analysis. That is, an over-approximation of accessed memory location is determined for a task assuming that all other tasks that may execute in parallel only perform independent accesses.

FIG. 2 shows the results of a sequential analysis determining symbolic ranges for array accesses. For every program label in which an array is being accessed, a pair of heap information and array index range are determined. The heap information records what abstract locations may be pointed to by the array base reference. The array index range records what indices of the array may be accessed by the statement via constraints on the idx variable. In this example, we used the polyhedra abstract domain to abstract numerical values, and the array index range is generally represented as a set of linear inequalities on local variables of the task.

For example, in line 5 of the example, the array base G may point to a single abstract location $A_G$, and the statement only reads a single cell in the array at index 2*tid−ps. The index expression uses the task identifier tid. Accessed array indices may depend on the task identifier. Furthermore, the coefficient for tid in this constraint is 2 and thus, this information could not have been represented in the Octagon numerical domain.

Depending on the program, some can be handled by Polyhedra and others by Octagon, still others may be handled by a different domain.

Checking Independence

Referring now to methods for establishing that array accesses of parallel tasks are independent. The code of FIG. 2 includes one write, the write to Gi[j] in line 14. The analysis tool establishes whether the write in line 14 conflicts with any of the read/write accesses made by other parallel tasks for different values of tid (i.e., different tasks). For example, to prove that when two different tasks identifiers $tid_1 \neq tid_2$ execute the write access in line 14, they will access disjoint locations. The analysis tool uses a pointer-analysis to establish the fact that $G[2*tid_1-ps] \square = G[2*tid_2-ps]$ when $tid_1 \neq tid_2$. In this example program, one can establish this fact automatically based on an analysis that tracks how the array G has been initialized. Generally, the fact that cells of an array point to disjoint objects is difficult to establish and may require analyses such as shape analysis.

Reporting Potential Sources of Non-Determinism

Figure 4:
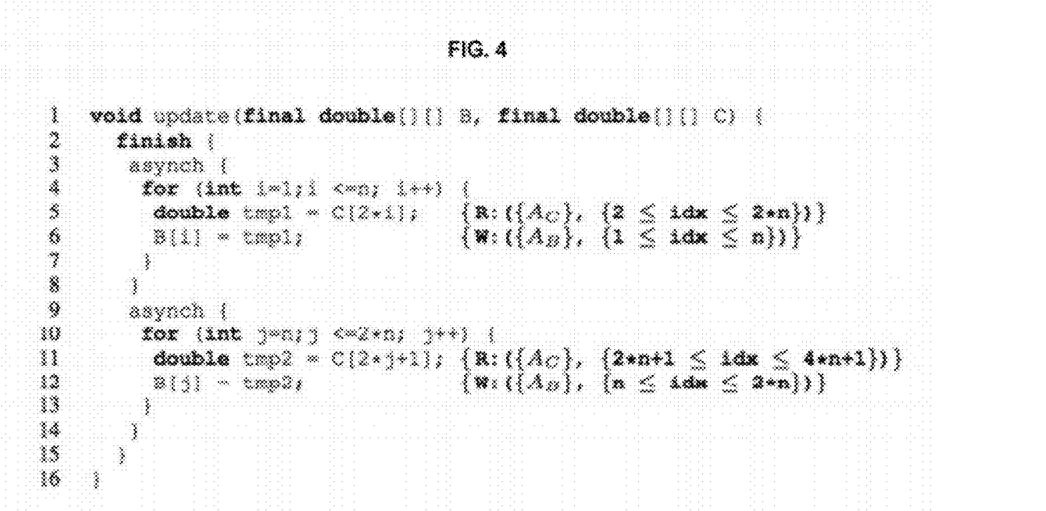
FIG. 4 is exemplary code for parallel accesses to shared arrays.

When independence of memory accesses cannot be established by pointer-analysis, the shared memory locations that could not be established as independent are reported. Consider the example for parallel accesses to shared arrays of FIG. 4. This example captures an exemplary pattern in which different parts of a shared array are updated in parallel. Applying an exemplary implementation of the present disclosure yields the ranges shown in FIG. 4. Here, a polyhedra analysis was used with a points-to analysis. The points-to analysis establishes two separate abstract locations for B and C. Checking the array ranges, however, shows that the write of line 6 overlaps with the write of line 12 on the array cell with index n. For this case, the analysis tool reports that the program is potentially non-deterministic due to conflicting access on the abstract locations described by ($\{A_{\bar{B}}\}$, {idx==n}). In some cases, such failures may be due to imprecision of the analysis.

Concrete Semantics

It may be assumed that a standard concrete semantics defines a program state and evaluation of an expression in a program state. The semantic domains are defined in a standard way in Table 1, where TaskIds is a set of unique task identifiers, VarIds is a set of local variable identifiers, and FieldId is a set of (instance) field identifiers.

TABLE 1

Semantic Domains

| | |
|---|---|
| $L^X \subseteq objs^X$ | an unbounded set of dynamically allocated objects |
| $v^X \in Val = objs^X \cup [null] \cup IN$ | values |
| $pc^X \in PC = TaskIds \square Labs$ | program counters |
| $\rho^X \in Env^X = TaskIds \times VarIds \square Val$ | environment |
| $h^X \in Heap^X = objs^X \times FieldId \square Val$ | heap |
| $A^X \subseteq L^X$ | array objects |

A program state is a tuple: $\sigma = \langle pc_o^X, L_o^X, \rho_o^X, h_o^X, A_o^X \rangle \in ST$, where $ST^X = PC \times 2^{objs^X} \times Env^X \times Heap^X \times 2^{objs^X}$ A state a keeps track of the program counter for each task ($pc_o^X$), the set of allocated objects ($L_o^X$), an environment mapping local variables to values ($\rho_o^X$), a mapping from fields of allocated objects to values ($h_o^X$), and a set of allocated array objects ($A_o^X$).

It may be assumed that program statements are labeled with unique labels. For an assignment statement at label l ∈Labs, the left hand side of the assignment is denoted by lhs(l), and the right hand side of the assignment is denoted by rhs(l).

Tasks($\sigma$)=dom($pc_\sigma^\chi$) denote the set of task identifiers in state $\sigma$, such that for each task identifier, $pc_\sigma^\chi$ assigns a value. Enablted($\sigma$)⊆dom($pc_\sigma^\chi$) denote the set of tasks that can make a transition from $\sigma$.

Determinism

Determinism may be defined as producing observationally equivalent outputs on all executions starting from observationally equivalent inputs. The determinism of parallel programs may be established by proving that shared memory accesses made by statements in different tasks are independent. This is a stronger condition, which avoids the need to define observational equivalence.

The treatment of shared field accesses is similar to observational equivalence.

Definition 1 (Accessed Array Locations in a State).

Given a state $\sigma \in ST^\chi$, $W_\sigma^\chi$: TaskIds→$2^{(A^\chi \times IN)}$ maps a task identifier to the memory location to be written by the statement at label $pc_\sigma(t)$. Similarly, $R_\sigma^\chi$: TaskIds→$2^{(A^\chi \times IN)}$ maps a task identifier to the memory location to be read by the statement at $pc_\sigma(t)$:

$$R_\sigma^\chi(t) = \{(\rho_\sigma^\chi(t,a), \rho_\sigma^\chi(t,i)) | \rho_\sigma^\chi(t) = l \wedge rhs(l) = a[i]\}$$

$$W_\sigma^\chi(t) = \{(\rho_\sigma^\chi(t,a), \rho_\sigma^\chi(t,i)) | \rho_\sigma^\chi(t) = l \wedge lhs(l) = a[i]\}$$

$$RW_\sigma^\chi(t) = R_\sigma^\chi(t) \cup W_\sigma^\chi(t)$$

Note that $R_\sigma^\chi(t)$, $W_\sigma^\chi(t)$ and $RW_\sigma^\chi(t)$ are always singleton or empty sets.

Definition 2 (Conflicting Accesses).

Given two shared memory accesses in states $\sigma_1, \sigma_2 \in ST^\chi$, performed respectively by task identifiers $t_1$ and $t_2$, the two shared accesses are conflicting, denoted by $(\sigma_1, t_1) ⚡ (\sigma_2, t_2)$ when: $t_1 \neq t_2$ and $W_{\sigma_1}^\chi(t_1) \cap RW_{\sigma_2}^\chi(t_2) \neq 0$ or $W_{\sigma_2}^\chi(t_2) \cap RW_{\sigma_1}^\chi(t_1) \neq 0$.

Definition 3 (Conflicting Program).

A program that is not conflicting is said to be conflict-free.

Given the set of all reachable program states RS⊆$ST^\chi$, the program is conflicting iff there exists a state $\sigma \in RS$ such that $t_1, t_2 \in$ Tasks($\sigma$), mhp(RS,$\sigma$,$t_1$,$pc_\sigma^\chi(t_1)$,$t_2$, $pc_\sigma^\chi(t_2)$)=true and $(\sigma, t_1) ⚡ (\sigma, t_2)$.

The definition of a conflicting program says that a program is conflicting if and only if there exists a state from which two tasks can perform memory accesses that conflict. The definition used herein does not allow even atomic operations to conflict. A deferent definition may be used, for example, when handling atomic operations.

In the above definition the predicate mhp:$2^{ST^\chi} \times ST^\chi \times$ TaskIds×Labs×TaskIds×Labs□Bool. The predicate mhp(S, $\sigma$,$t_1$,$l_1$,$t_2$,$l_2$) may be used, which evaluates to true if $t_1$ and $t_2$ may run in parallel from state $\sigma$.

Computing mhp

The computation of the mhp is parametric to the analysis. That is, an mhp of arbitrary precision can be consumed. For example, mhp(S,$\sigma$,$t_1$,$l_1$,$t_2$,$l_2$) may be defined to be true iff $t_1, t_2 \in$ enabled ($\sigma$) and $t_1 \neq t_2$.

Less precise (more abstract) variants of mhp may be defined. For example, mhp(S,$\sigma$,$t_1$,$l_1$,$t_2$,$l_2$)=true iff∃$\sigma'$ ∈S,$t_1$, $t_2 \in$ enabled($\sigma'$), $t_1 \neq t_2$ such that $pc_{\sigma'}^\chi(t_1) = l_1$ and $pc_{\sigma'}^\chi(t_2) = l_2$. As the mhp depends on S and not on $\sigma$, the mhp may be written as mhp(S,$\sigma$,$t_1$,$l_1$,$t_2$,$l_2$). This definition is directed at the level of labels and may be preferable for efficiency purposes. When the set S is assumed to be all reachable programs states, we write mhp($t_1$,$l_1$,$t_2$,$l_2$).

The structure of the parallel program is used to compute the mhp precisely, but in cases where general Java programs with arbitrary concurrency are considered, more expensive techniques may be used.

Pairwise Semantics

The relationship between the different tasks may be abstracted away and semantics defined that only track each task separately, rather than all tasks simultaneously. The projection $\sigma|t$ of a state $\sigma$ on a task identifier t may be defined as $\sigma|_t \langle pc|_t, L, \rho|_t, h, A \rangle$, where:

$pc|_t$ is the restriction of pc to t $\rho|_t$ is the restriction of $\rho$ to t Given a state $\sigma \in ST^\chi$, the program state for a single task t may be defined via $\sigma|_t = \langle pc, L, \rho, h, A \rangle \in \Sigma$, where $ST_{pw}^\chi = (PC \times 2^{objs^\chi} \times Env^\chi \times Heap^\chi \times 2^{objs^\chi})$. For S⊆$ST^\chi$:

$$\alpha_{pw}(S) = \bigcup_{\sigma \in S} \{\sigma|_t | t \in \text{Tasks}(\sigma)\}$$

Definition 4 (Pairwise-Conflicting Program).

Given the set of all reachable program states $RSP_{pw} \subseteq ST^\chi$, it can be said that the program is pairwise conflicting when there exists $\sigma_1^{pw}, \sigma_2^{pw}, RS^{pw}$ such that for some $t_1 \in$ Tasks($\sigma_1^{pw}$), $t_2 \in$ Tasks($\sigma_2^{pw}$), mhp($RS^{pw}$,$t_1$, $pc_{\sigma_1^{pw}}^\chi(t_1)$,$t_2$,$pc_{\sigma_2^{pw}}^\chi(t_2)$)=true and $(\sigma_1^{pw}, t_1) ⚡ (\sigma_2^{pw}, t_2)$.

Note that in this definition of a conflicting program, Definition 2 is used with two states $\sigma_1^{pw}$ and $\sigma_2^{pw}$, while in Definition 3, Definition 2 is used with a single state $\sigma$. Assuming the mhp predicate returns identical results in Definition 3 and Definition 4, any conflicting program may be considered to be pairwise-conflicting.

Due to lost precision with the pairwise semantics, it could be the case that a program is pairwise-conflicting but not conflicting.

Abstract Semantics

The pairwise semantics tracks a potentially unbounded set of memory locations accessed by each task. In this section, standard abstract domains are used to represent sets of locations in a bounded way. Sets of objects are represented using standard points-to abstractions, and ranges of array cells using numerical abstractions on array indices.

Abstract State

The abstraction is parametric on both the heap abstraction $\alpha_h$ and the numerical abstraction $\alpha_n$. In the following, we assume an abstract numerical domain ND=$\langle NC, \sqsubseteq_{ND} \rangle$ equipped with operations $\sqcup_{ND}$ and $\sqcup_{ND}$, where NC is a set of numerical constraints over the primitive variables in VarIds, and do not go into further details about the particular abstract domain.

Definition 5. An abstract program state $\sigma$ is a tuple $\langle pc, L_\alpha, \rho_\alpha, h_\alpha, A_\alpha, nc \rangle \in ST_\alpha$, where $ST_\alpha = PC \times 2^{objs} \times Env \times Heap \times 2^{objs} \times NC$ such that:

$L_\alpha \subseteq$ objs is a bounded set of abstract objects, and $A_\alpha \subseteq L_\alpha$ is a set of abstract array objects.

$\rho_\alpha$: TaskIds×VarIds→$2^{AVal}$ maps a task identifier and a variable to its abstract values.

$h_\alpha$: objs×FieldId→$2^{AVal}$ map an abstract location and a field identifier to their abstract values.

nc: TaskIds→$2^{NC}$ maps a task to a set of numerical constraints, capturing relationship between local numerical variables of that task.

An abstract program state is a sound representation of a concrete pairwise program state $\sigma^{pw}=\langle pc^\chi, L^\chi, \rho^\chi, h^\chi, A^\chi \rangle$ when:

$pc=pc^\chi$.

for all $o \in L^\chi, \alpha_h(o) \in L_\alpha$.

for all $o_1, o_2 \in L^\chi$, $f \in \text{FieldId}$, if $h^\chi(o_1,f)=o_2$ then $\alpha_h(o_2) \in h_\alpha(\alpha_h(o_1),f)$.

$\text{dom}(\rho)=\text{dom}(\rho^\chi)$ for all task reference variables $(t,r) \in \text{dom}(\rho^\chi)$, if $v=\rho^\chi(t,r)$ then $\alpha_h(v) \in \rho_\alpha(t,r)$.

Let $TL_t=\{(pr_0,v_0) \ldots (pr_n,v_n)\}$ be the set of primitive variable-value pairs, such that for all pairs $(pr_i, v_i) \in TL_t$, $(t,pr_i) \in \text{dom}(\rho^\chi)$. Then $\alpha_n(TL_t) \sqsubseteq_{ND} \text{nc}(t)$.

Next, we define the accessed array locations in an abstract state:

Definition 6 (Accessed Array Locations in an Abstract State).

Given an abstract state $\sigma \in ST_\alpha$, we define $W_\sigma: \text{TaskIds} \rightarrow 2^{(AVal \times VarIds)}$ which maps a task identifier to the memory location to be written by the statement at label $pc_\sigma(t)$. Similarly, $R_\sigma: \text{TaskIds} \rightarrow 2^{(AVal \times VarIds)}$ maps a task identifier to the memory location to be read by its statement at $pc_\sigma(t)$.

$$R_\sigma(t) = \left\{(\rho_\sigma(t,a), i) | pc_\sigma(t) = l \wedge rhs(l) = a[i]\right\}$$

$$W_\sigma(t) = \left\{(\rho_\sigma(t,a), i) | pc_\sigma(t) = l \wedge lhs(l) = a[i]\right\}$$

$$RW_\sigma(t) = R_\sigma(t) \cup W_\sigma(t)$$

$$IX_\sigma(t) = \begin{cases} i, \ pc_\sigma(t) = l \wedge (lhs(l) = a[i] \vee rhs(l) = a[i]); \\ \bot, \text{ otherwise} \end{cases}$$

Note that $R_\sigma$, $W_\sigma$ and $RW_\sigma$ are always singleton or empty sets. $D_\sigma(t) \cdot B$ and $D_\sigma(t) \cdot I$ may be used to denote the first and second components of the entry in the singleton set D, where D can be one of R, W or RW. If $D_\sigma(t)$ is empty, then $D_\sigma(t) \cdot B$ and $D_\sigma(t) \cdot I$ also return the empty set.

Definition 7 (Abstract Conflicting Accesses).

Given two shared memory accesses in states $\sigma_1, \sigma_2 \in ST_\alpha$, performed respectively by task identifiers $t_1$ and $t_2$, we say that the two shared accesses are conflicting, denoted by $(\sigma_1, t_1)$ ⊠ abs $(\sigma_2, t_2)$ when:

$W_{\sigma1}(t_1) \cdot B \cap RW_{\sigma2}(t_2) \cdot B \neq 0$ and $(W_{\sigma1}(t_1) \cdot I \cap RW_{\sigma2}(t_2) \cdot I) \sqcap_{ND} AS \neq \bot$ or $W_{\sigma2}(t_2) \cdot B \cap RW_{\sigma1}(t_1) \cdot B \neq 0$ and $(W_{\sigma2}(t_2) \cdot I \cap RW_{\sigma2}(t_2) \cdot I) \sqcap_{ND} AS \neq \bot$ where $AS = \text{nc}_{\sigma1}(t_1) \sqcap_{ND} \text{nc}_{\sigma2}(t_2) \sqcap_{ND} (t_1 - t_2 \geq 1)$ The definition uses the meet operation $\sqcap_{ND}$ of the underlying numerical domain to check whether the combined constraints may be satisfied. If the result is not empty (e.g. not $\bot$), then this indicates a potential overlap between the array indices. The constraint of the kind (W·I=RW·I) corresponds to the property we are trying to refute, namely that the indices are equal. In addition, a global constraint is added that requires that task identifiers are distinct. The constraint is written as $(t_1 - t_2 \geq 1)$ as opposed to $(t_1 - t_2 > 0)$ since the first form is precisely expressible in both Octagon and Polyhedra, while the second form is only expressible in Polyhedra. It may be assumed that primitive variables from two different tasks have distinct names.

The definition of abstract conflicting accesses leads to a natural definition of abstract pairwise conflicting program based on Definition 4. Due to the soundness of the abstraction it follows that if the program is abstract (pairwise) conflict free, then it is (pairwise) conflict free under the concrete semantics.

Implementation

In one exemplary implementation, an analysis tool is based on the Soot framework. This allows for the use of existing analyses implemented in Soot, such as the various points-to analyses. In this case, the input to analysis tool is a Java program with annotations that denote the code of each task. In fact, a core analysis is based purely on the Jimple intermediate representation produced by the Soot front end, as long as it knows what code each task executes, the analysis is applicable to standard concurrent Java programs.

The complete analysis works as follows:

Step 1: Apply Heap Abstraction First, the SPARK flow-insensitive pointer analysis is applied on the whole program. Flow-insensitive analysis is sound in the presence of concurrency, while a pointer analysis may be imprecise in some cases. In the case of pointer analysis, additional heap information may be determined (see the UniqueRef invariant herein).

Step 2: Apply Numerical Abstraction Second, for each task, the appropriate (sequential) numerical analysis is applied. The numerical analysis tool uses the Java binding of the Apron library. The environment of the analysis is initialized only with variables of integer type. As real variables cannot be used as array indices, they are ignored by the analysis tool.

Step 3: Compute MHP Third, the mhp predicate is determined. In the annotated Java code, this is computed as the annotations denote which tasks can execute in parallel and given that parallel tasks don't use any synchronization constructs internally, it implies that all statements in two parallel tasks can also execute in parallel. In the case where standard Java programs are consumed, which use more complex synchronization primitives such as monitors, one can use an off-the-shelf MHP analysis (cf. [22,27]).

Step 4: Verify Conflict-Freedom Finally, we check whether the program is conflict-free: for each pair of abstract states from two different tasks, we check whether that pair is conflict-free according to Definition 7. In our examples, it is often the case that the same code is executed by multiple tasks. Therefore, in our implementation, we simply check whether the abstract states of a single task are conflict-free with themselves. To perform the check, we make sure that local variables are appropriately renamed (the underlying abstract domain provides methods for this operation). Parameter variables that are common to all tasks that execute the same code maintain their name under renaming and are distinguished by special names.

Note that our analysis verifies conflict-freedom between tasks in a pairwise manner, and need not make any assumption on the number of threads in the system. This enables our analysis to handle program with an unbounded number of threads.

Reference Arrays

Many parallel programs use reference arrays, usually multi-dimensional primitive arrays (e.g. int A[ ][ ]) or reference arrays of standard objects such as java.lang.String (e.g. String B[ ]). In Jimple (and Java bytecodes), multi-dimensional arrays are represented via a hierarchy of one-dimensional arrays. Accesses to a k-dimensional array is comprised of k accesses to one-dimensional arrays. In many of our benchmarks, parallel tasks operate on disjoint portions of a reference array. However, often, given an array int A[ ][ ], each parallel task accesses a different outer dimension, but accesses the internal array int A[ ] in the same way. For example, task 1 can write to A[1][5], while task 2 can write to A[2][5]): the outer dimension (e.g.) is different, but the inner dimension (e.g. 5) is the same. The standard pointer analysis fails to establish that A[1][5] and A[2][5] are disjoint, and hence our analysis fails to prove determinism.

UniqueRef Global Invariant However, in all of our benchmarks, the references inside reference arrays never alias. This is common among scientific computing benchmarks as they have a pre-initialization phase where they fill up the array, and thereafter, only the primitive values in the array are modified.

To capture this, on startup, a global analysis is performed to establish that all writes of reference variables to cells in the reference array are only assigned to once with a fresh object, either a newly allocated object or a reference obtained as a result of a library call such as java.lang.String.substring that returns a fresh reference. While this treatment suffices for certain benchmarks, general treatment of handling references inside objects may require additional heap analysis.

Once this invariant is known to hold, the pointer analysis information (to know that the inner dimensions of an array are distinct) may be refined, or the invariant may be used directly in the analysis.

Evaluation

To evaluate the analysis tool, the JGF benchmarks used by the HJ suite where used. These benchmarks are modified versions of the Java JGF benchmarks.

The analysis tool works on the Jimple intermediate representation, which is a three-address code representation for Java. Working at the Jimple level enables us to use standard analyses implemented in Soot, such as the Spark points-to analysis. However, Jimple creates a large number of temporary variables, resulting in many more variables than the original Java source. This may lead to a larger number of numerical constraints compared to the ones arising when analyzing the program at the source level as in the case of the Interproc analyzer.

Analysis benchmarks required the use of widening. The LoopFinder API was used as provided by Soot to identify loops and applied a basic widening strategy which only widens at the head of the loop and does so every k'th iteration, where k is a parameter to the analysis.

Results

Experiments were conducted using a Java 1.6 runtime running on a 4-core Intel® Xeon™ CPU 3.80 GHz processor with 5 GB. Table 2 summarizes the results of the exemplary analysis. The columns indicate the benchmark name and description, lines of code for the analyzed program, the number of integer-valued variables used in the analysis, the numerical domain used, the number of iterations it took for the analysis to reach a fixed point, the combined time of the numerical analysis and verification checking (pointer analysis time is not included even if used), whether the analysis needed widening to terminate, whether Spark pointer analysis was used (note that we almost always use the UniqueRef invariant as the programs make heavy use of multi-dimensional arrays), and the result of the analysis where ✓ denotes that it successfully proved determinism, and ✗ denotes that it failed to do so.

TABLE 2

Experimental Results

| Benchmark | Description | LOC | Vars | Domain | Iter | Time (s) | Widen | PA | Result |
|---|---|---|---|---|---|---|---|---|---|
| CRYPT | IDEA encryption | 110 | 180 | Polyhedra | 439 | 54.8 | No | No | ✓ |
| SOR | Successive over-relaxation | 35 | 21 | Polyhedra | 72 | 0.41 | Yes | No | ✓ |
| LUFACT | LU Factorization | 32 | 22 | Octagon | 57 | 1.94 | Yes | No | ✓ |
| SERIES | Fourier coefficient analysis | 67 | 14 | Octagon | 22047 | 55.8 | No | No | ✓ |
| MOLDYN1 | Molecular dynamics simulation | 85 | 18 | Octagon | 85 | 24.6 | No | No | ✓ |
| MOLDYN2 | | 137 | 42 | Polyhedra | 340 | 2.5 | Yes | Yes | ✓ |
| MOLDYN3 | | 31 | 8 | Octagon | 78 | 0.32 | Yes | No | ✓ |
| MOLDYN4 | | 50 | 10 | Polyhedra | 50 | 1.01 | No | No | ✓ |
| MOLDYN5 | | 37 | 18 | Polyhedra | 37 | 0.34 | No | No | ✓ |
| SPARSE | Sparse matrix multiplication | 29 | 17 | Polyhedra | 45 | 0.2 | Yes | Yes | X |
| RAYTRACER | 3D Ray Tracer | — | — | — | — | — | — | — | X |
| MONTECARLO | Monte Carlo simulation | — | — | — | — | — | — | — | X |

As mentioned earlier, in the benchmarks, the mhp predicate may be pre-computed to determine which tasks can run in parallel. That is, there is no need to perform numerical analysis on tasks that can never run in parallel with other tasks. Therefore, the lines of code in the table refer only to the relevant code that may run in parallel and is analyzed by the numerical analysis. The actual applications contain many more lines of code (e.g., on the order of thousands), as they need to pre-initialize the computation, but such initialization code never runs in parallel with other tasks.

Applying the Analysis

For every benchmark, we first attempted to verify determinism with the simplest available configuration: e.g. Octagon domain without widening or pointer analysis. If the analysis did not terminate within 10 minutes, or failed to prove the program deterministic, then we tried adding widening and/or changing the domain to Polyhedra and/or performing pointer analysis. Usually, we did not find the need for using Spark. Instead, we almost always rely on the UniqueRef invariant.

For five of the benchmarks, the analysis managed to prove determinism, while it failed to do so for three benchmarks. Next, we elaborate on the details.

CRYPT involves reading and updating multiple shared one-dimensional arrays. This is a computationally intensive benchmark and its intermediate representation contains many variables. When we used the Octagon domain without widening, the analysis did not terminate and the size of the constraints kept growing. Even after applying our widening strategy (widening at the head of the loop) with various frequencies (e.g. the parameter k mentioned earlier), we still could not get the analysis to terminate. Only after applying aggressive widening: in addition to every loop head, to widen at some points in the loop body, the analysis terminated. But even when it terminated, the analysis was unable to prove determinism. The reason is that the program computes array indices for each task based on the task identifier via statements such as $ix_i=8*tid_i$, where $ix_i$ is the index variable and $tid_i$ is the task identifier variable. Such constraints cannot be directly expressed in the Octagon domain. However, by using the Polyhedra domain, the analysis managed to terminate without widening. It successfully captured the simple loop exit constraint $ix_i \geq k$ (even with the loop body performing complicated updates). It also preserved constraints such as $ix_1=8*tid_1$. As a result, the computed constraints were precise enough to prove the program deterministic, which is the result that we report in the table.

In SOR, without widening, both Octagon and Polyhedra failed to terminate. With widening, Octagon failed to prove determinism due to the use of array index expressions such as $ix_i=2*tid_i-v$, where $tid_i$ is the task identifier variable and v is a parameter variable. Constraints, such as $i_i=k*tid_i$, where k>1 cannot be expressed in the Octagon domain and hence the analysis fails. Using Polyhedra with widening quickly succeed in proving determinism.

Without widening and with Octagon, the analysis did not terminate in LUFACT. However, with widening and Octagon, the analysis quickly reached a fixed point. The SERIES benchmark succeeds only with Octagon and required no widening but it took the longest to terminate.

MOLDYN contains a sequence of five blocks where only the tasks inside each block can run in parallel and tasks from different blocks cannot run in parallel. Interestingly, each block of tasks can be proved deterministic by using different configurations of domain, widening and pointer analysis. In Table 2, we show the result for each block as a separate row in the table.

In the first block, tasks execute straight line code and determinism can be proved only with Octagon and no widening. In the second block, tasks contain loops and require Polyhedra, widening and pointer analysis. Without widening, both Octagon and Polyhedra do not terminate. With widening, Octagon terminates, but fails. The problem is that the array index variable $ix_i$ixi is computed with the statement $ix_i=k*tid_i$, where k is a constant and k>1. The Octagon domain cannot accurately represent abstract elements with such constraints. We used the pointer analysis to establish that references loaded from two different arrays are distinct, but we could have also computed that with the UniqueRef invariant. Tasks in the third block succeed with Octagon but also require widening. Tasks in the fourth and fifth blocks do not need widening (there are no loops), but require Polyhedra as they are using constraints such as $ix_1=k*tid_1$, where k>1.

In SPARSE, the Polyhedra fails as the tasks use array indices obtained from other arrays, e.g. A[B[i]], where the values of B[i] are initialized on startup. The analysis required widening to terminate, but is unable to establish anything about B[i] and hence cannot prove independence of two different array accesses A[j] and A[k], where j and k come from some B[i].

In RAYTRACER, analysis fails as the program involves non-linear constraints such as ix=x*y+z and also uses atomic sections, which our analysis currently does not handle. In the case of non-linear constraints, even though we have x*y as an expression, the variable x is in fact immutable (it is computed once on startup and never changed), so perhaps some extension on the analysis is possible for handling this benchmark.

The methodologies of embodiments of the invention may be particularly well-suited for use in an electronic device or alternative system. Accordingly, embodiments of the present disclosure may take the form of an entirely hardware embodiment or an embodiment combining software and hardware aspects that may all generally be referred to herein as a "processor", "circuit," "module" or "system." Furthermore, embodiments of the present disclosure may take the form of a computer program product embodied in one or more computer readable medium(s) having computer readable program code stored thereon.

Any combination of one or more computer usable or computer readable medium(s) may be utilized. The computer-usable or computer-readable medium may be a computer readable storage medium. A computer readable storage medium may be, for example but not limited to, an electronic, magnetic, optical, electromagnetic, infrared, or semiconductor system, apparatus, device, or any suitable combination of the foregoing. More specific examples (a non-exhaustive list) of the computer-readable storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus or device.

Computer program code for carrying out operations of embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the present disclosure are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions.

These computer program instructions may be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Figure 5:
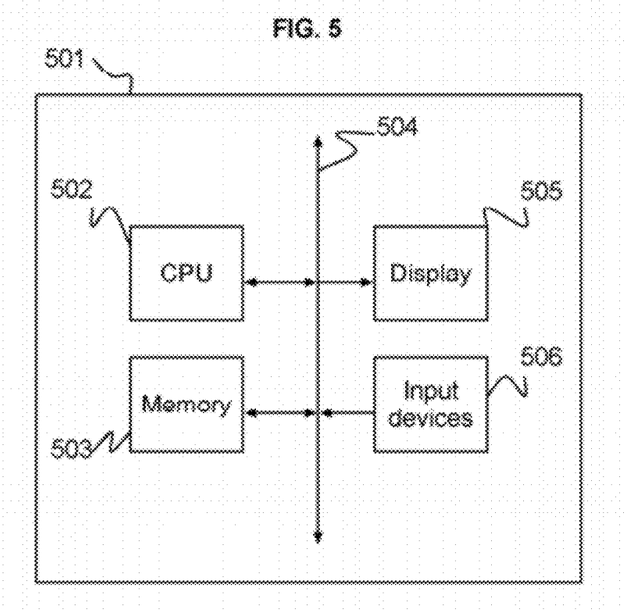
FIG. 5 is an exemplary system for implementing automatic verification of determinism in structured parallel programs according to an embodiment of the present disclosure.

For example, FIG. 5 is a block diagram depicting an exemplary system for automatically verifying determinism of structured parallel programs. The system 501 may include a processor 502, memory 503 coupled to the processor (e.g., via a bus 504 or alternative connection means), as well as input/output (I/O) circuitry 505-506 operative to interface with the processor 502. The processor 502 may be configured to perform one or more methodologies described in the present disclosure, illustrative embodiments of which are shown in the above figures and described herein.

It is to be appreciated that the term "processor" as used herein is intended to include any processing device, such as, for example, one that includes a central processing unit (CPU) and/or other processing circuitry (e.g., digital signal processor (DSP), microprocessor, etc.). Additionally, it is to be understood that the term "processor" may refer to more than one processing device, and that various elements associated with a processing device may be shared by other processing devices. The term "memory" as used herein is intended to include memory and other computer-readable media associated with a processor or CPU, such as, for example, random access memory (RAM), read only memory (ROM), fixed storage media (e.g., a hard drive), removable storage media (e.g., a diskette), flash memory, etc. Furthermore, the term "I/O circuitry" as used herein is intended to include, for example, one or more input devices (e.g., keyboard, mouse, etc.) for entering data to the processor, and/or one or more output devices (e.g., printer, monitor, etc.) for presenting the results associated with the processor.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although illustrative embodiments of the present disclosure have been described herein with reference to the accompanying drawings, it is to be understood that the invention is not limited to those precise embodiments, and that various other changes and modifications may be made therein by one skilled in the art without departing from the scope of the appended claims.

What is claimed is:

1. A computer program product for automatically verifying determinism of a structured parallel program, the computer program product comprising:
   a non-transitory computer readable storage medium having computer readable program code embodied therewith, the computer readable program code comprising:
      computer readable first program code configured to sequentially establish whether second program code in each of a plurality of tasks of the structured parallel program is independent, configured to output sequential proofs corresponding to the independence of the second program code in each of the plurality of tasks and configured to determine whether all memory locations accessed by the plurality of tasks are independent based on the sequential proofs,
      wherein the first program code determines for each second program code whether a first program label is present within the second program code that accesses a same array via an index variable within the second program code,
      wherein the first program code determines for each index variable all values the corresponding index variable is capable of reaching using at least one second program label within the corresponding second program code to determine an over-approximated range of values,
      wherein each range is represented as a linear inequality using the corresponding index variable; and
      wherein the first program code determines two or more of the second programs codes are independent when the determined ranges are non-overlapping with respect to the same array.

2. The computer program product of claim 1, wherein the first program code uses the determined ranges to generate an over-approximation of memory locations for the plurality of tasks that will be accessed.

3. The computer program product of claim 1, further comprising computer readable program code configured to report shared memory locations of the second program code in the tasks.

4. The computer program product of claim 1, wherein each range is with respect to a write instruction within a corresponding one of the second program codes.

5. The computer program product of claim 4, wherein the first program code determines one of the second program codes not to be independent when the write instruction references a location of the array that is also within another one of the ranges.

6. The computer program product of claim 1, wherein the at least one second program label is at least one program statement that increments or decrements the corresponding index variable.

7. A system for automatically verifying determinism of a structured parallel program comprising:
   a memory device storing a plurality of instructions embodying the system for automatically verifying determinism of structured parallel programs; and
   a processor configured to execute the plurality of instructions to perform a method comprising:
   establishing, sequentially, whether program code in each of a plurality of tasks of the structured parallel program is independent;
   outputting sequential proofs corresponding to the independence of the program code in each of the plurality of tasks; and
   determining whether all memory locations accessed by the plurality of tasks are independent based on the sequential proofs,
   wherein the establishing:
      determines for each program code whether a first program label is present within the program code that accesses a same array via an index variable within the program code,
      determines for each index variable all values the corresponding index variable is capable of reaching using at least one second program label within the corresponding program code to determine an over-approximated range of value, determines whether two or more of the program codes are independent when the determined ranges are non-overlapping with respect to the same array, and wherein each range is represented as linear inequality using the corresponding index variable.

8. The system of claim 7, wherein the establishing uses the ranges to generate an over-approximation of memory locations for the plurality of tasks that will be accessed.

9. The system of claim 7, wherein the method further comprises reporting shared memory locations of the code in the tasks.

10. The system of claim 7, wherein each range is with respect to a write instruction within a corresponding one of the codes.

11. The system of claim 10, wherein the establishing determines one of the codes not to be independent when the write instruction references a location of the array that is within another one of the ranges.

12. The system of claim 7, wherein the at least one second program label is at least one program statement that increments or decrements the corresponding index variable.

* * * * *